Patented May 2, 1950

2,505,870

UNITED STATES PATENT OFFICE 2,505,870

SECONDARY AND TERTIARY ALKYLTHIOL AMINES AND THEIR PRODUCTION

Harold R. Snyder, Urbana, Ill., and John M. Stewart, Berkeley, Calif., assignors to Phillips Petroleum Company, a corporation of Delaware No Drawing. Application May 9, 1947, Serial No. 747,123

12 Claims. (Cl. 260—293)

This invention relates to a method for the production of secondary and tertiary amino thiols and to the products formed thereby. More specifically, the present invention relates to a method for the production of secondary and tertiary amino thiols by the reaction of an amine with an olefin sulfide and to the products produced thereby.

In accordance with this invention it has been found that when selected olefin sulfides are reacted with primary or secondary amines under the reaction conditions more fully disclosed hereinafter, secondary and tertiary amino thiols are formed as the principal reaction products. The reaction products have important uses in the field of manufacture of synthetic rubber. In addition they are useful as intermediates for the preparation of other chemical products.

The employment of thiols as modifiers and promoters in emulsion polymerization processes, as additives to synthetic elastomers, intermediates in the production of sulfur-containing organic chemicals, and the like has become significant in the chemical industry. A class of potentially valuable thiols for use in such processes comprises those containing one or more additional functional groups situated near the sulfhydryl group. An important group of compounds belonging to this class is comprised of those substances known as amino thiols, in which a primary or secondary amino group is substituted in the beta position. However, amino thiols as previously known to the art, are in general primary mercaptans and usually have the disadvantage of being rapidly oxidized by the oxygen of the air, even at room temperatures, and are generally of limited value in chemical operations.

An object of the present invention is to provide a method for the production of secondary and tertiary amino thiols. Another object of the present invention is to provide such a process wherein an olefin sulfide is reacted with an amine to produce an amino thiol. Still another object of this invention is to provide a process for the interaction of olefin sulfides with primary and secondary amines under conditions such that secondary and tertiary amino thiols form the principal reaction products. A further object of this invention is to provide new chemical compounds belonging to the class of beta-substituted mercaptans, or amino thiols.

We have now found that secondary and tertiary amino thiols can be produced by the interaction of selected olefin sulfides with primary and secondary amines and that the said amino thiols so produced are substantially stable toward atmospheric oxidation effects at ordinary temperatures. As stated hereinabove, various primary and secondary amines may be reacted with various olefin sulfides in accordance with the present invention to produce secondary and tertiary amino thiols. The olefin sulfides, of which ethylene sulfide is the simplest member, contain a sulfur atom attached to two directly-connected carbon atoms, which may be represented structurally as follows:

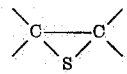

wherein the carbon atoms may be a part of a ring or of an open chain of greater length. The olefin sulfides which are useful in the process of the present invention are those which contain a tertiary carbon atom attached to the sulfur atom or those in which the carbon atoms attached to the sulfur atom are both secondary carbon atoms. The alicyclic olefin sulfides e. g. cyclohexene sulfide, fall in the latter group. The open chain olefin sulfides which may be used in the process may be represented structurally as follows:

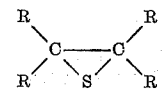

wherein R is selected from the class consisting of hydrogen, alkyl, aryl, and aralkyl radicals not more than two of which are hydrogen. Thus the olefin sulfides used in the present invention are those selected from the group consisting of olefin sulfides containing at least one tertiary carbon atom attached to the sulfur atom and olefin sulfides containing two secondary carbon atoms. As examples of olefin sulfides suitable for use in the process of the present invention the following may be mentioned: isobutylene sulfide, 2,3 butylene sulfide, higher alkene sulfides; cyclic olefin sulfides, e. g., cyclopentene sulfide, cyclohexene sulfide, and the like; and substituted olefin sulfides.

Primary and secondary amines useful in the process of this invention may be represented structurally as follows:

wherein the nitrogen atom may be a part of a ring, or of an open chain wherein the dangling valences are attached to not more than one hydrogen atom and to at least one hydrocarbon radical, particularly alkyl, aryl, aralkyl, or aromatic radicals. The primary and secondary amines suitable for use in the process of this invention include alkyl, aryl, aralkyl, and cyclic amines and substituted alkyl, aryl, aralkyl, and cyclic amines. The aliphatic amines are most reactive in our process.

The reaction of olefin sulfides with amines by the process of our invention proceeds according to the following equation:

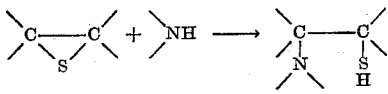

With a cyclic olefin sulfide, e. g., cyclohexene sulfide, secondary amino thiols are produced as indicated in the following equation:

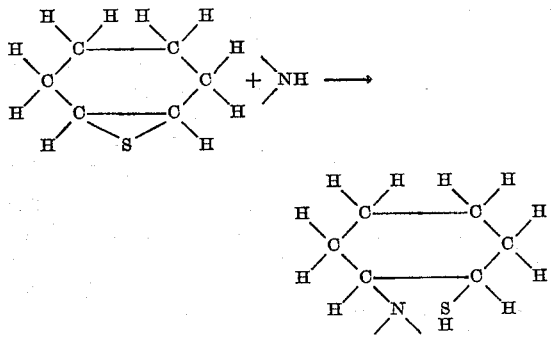

Tertiary amino thiols are produced from open chain olefin sulfides, containing a tertiary carbon atom attached to the sulfur atom e. g., isobutylene sulfide, according to the following equation:

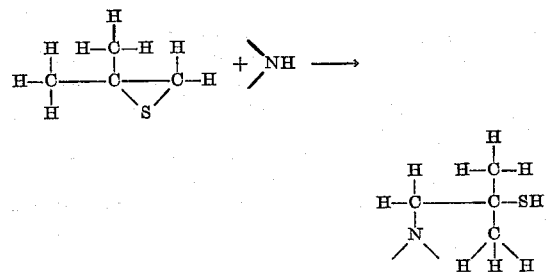

In some instances small amounts of the primary isomer may be formed concurrently with the tertiary amino thiol of the above reaction. However, in such instances the ratio of tertiary to primary amino thiols is on the order of about 99:1 and the compositions so produced are generally suitable for the aforementioned uses without separation. It is evident that numerous new chemical compounds may be produced by the present process.

In carrying out the reaction a mixture of the amine and olefin sulfide is made up, usually with the amine present in an amount in excess of the theoretical. Desirably, but not necessarily, the reaction mixture is agitated during at least a part of the reaction period. The reaction is carried out at a temperature selected to produce the desired product. We have found that the reaction between primary and secondary amines and olefin sulfides containing a tertiary carbon atom attached to the sulfur atom produces tertiary amino thiols as the principal reaction product almost to the exclusion of other reaction products when the temperature of the reaction is less than 100° C. When cyclic olefin sulfides are employed, for example cyclohexene sulfide, somewhat higher temperatures may be used; preferably the reaction temperature for reaction of cyclic olefin sulfides with primary and secondary amines is within the range of from about 20° C. to about 160° C. It will be obvious to one skilled in the art that a temperature above the decomposition temperature of the reactant or product should not be employed. To increase the rate of reaction, it is often desirable to heat the mixture of reactants to a temperature somewhat above normal room temperature (20° C.) generally to about the boiling point of the mixture, but less than 100° C. for open chain olefin sulfides. A number of the reaction products of olefin sulfides and amines have been prepared by heating the reaction mixture to a temperature above about 85° C. but less than 100° C. While the reaction is preferably carried out in liquid phase it may in some instances be carried out in vapor phase if desired. A period of from about one hour to about one hundred hours is suitable for the reaction, but a reaction time of from about 6 to about 24 hours is generally sufficient and preferably employed. The reaction pressure is not critical and may be varied over a rather wide range; ordinary atmospheric pressure is conveniently used in carrying out the reaction.

In carrying out the reaction the mixture of amine and olefin sulfide may or may not be diluted with an inert diluent such as a paraffin or aromatic hydrocarbon. The reaction product may be dissolved in a suitable solvent such as diethyl ether. The product is suitably washed with water and purified by distillation; it may be dried and purified in any other suitable manner by methods known in the art.

In a specific embodiment the method of the present invention comprises heating a mixture of the olefin sulfide and the primary or secondary amine to a temperature above about 85° C. and below 100° C. for a period from about 6 to about 24 hours. At the end of the reaction period the product is extracted with ether, washed, dried, and distilled under reduced pressure. This general procedure was used in carrying out the following specific examples which illustrate particular embodiments of the present invention. The examples are not to be construed as limiting the invention in any way but merely illustrative of the principles underlying the invention.

EXAMPLE I

*N-piperidino-tert-butylthiol*

A mixture of 8.8 grams of isobutylene sulfide and 8.5 grams of piperidine was heated under reflux on the steam cone for 20 hours. The reaction mixture was taken up in ether, washed three times with 10 ml. portions of water and dried over anhydrous sodium sulfate. The extract was distilled under reduced pressure to provide 10.5 grams of product boiling at 53–56° C. (1.5 mm.) and with a refractive index of 1.4848 at 20° C. The yield was 60.7 per cent of theoretical based on starting materials. Formula for the product was

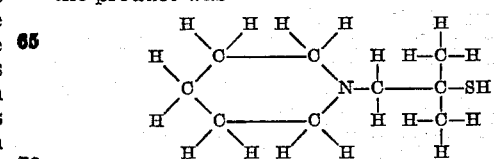

EXAMPLE II

*N-heptylamino-tert-butylthiol*

A mixture of 11.5 grams of n-heptylamine and 4.4 grams of isobutylene sulfide was heated at reflux temperature for 17 hours. Vacuum distillation of the ether extract yielded 5.1 grams (49.3 per cent of theory) of product boiling at 83–86° C. (2 mm.) and with an index of refraction of 1.4630 at 15° C. Formula for the product was

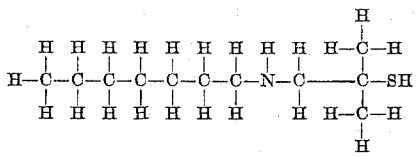

EXAMPLE III

N-beta-pipecolino-tert-butylthiol

A mixture of 9.7 grams of beta-pipecoline and 8.8 grams of isobutylene sulfide was heated for 16 hours at reflux temperature. The reaction mixture was taken up with ether, washed with water and dried over anhydrous sodium sulfate. Vacuum distillation of the extract provided 12 grams (65 per cent of theory) of product boiling at 49–57° C. (2.5 mm.) and with an index of refraction of 1.4782 at 20° C. The formula was

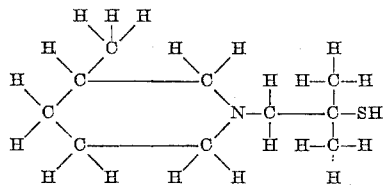

EXAMPLE IV

Di-n-heptylamino-tert-butylthiol

A mixture of 10.7 grams of di-n-heptylamine and 4.4 grams of isobutylene sulfide was heated on the steam cone for 24 hours. Distillations of the reaction mixture after washing with water and drying over anhydrous sodium sulfate yielded 62.25 per cent of the theoretical amount of di-n-heptylamino-tert-butylthiol, boiling point 124–126° C. (2.5 mm.). Formula for the product

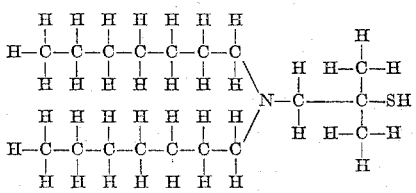

EXAMPLE V

N-(4 ethylpiperidino)-tert-butylthiol

A mixture of 29 grams of 4-ethyl piperidine and 22.6 grams of isobutylene sulfide was heated at reflux temperature for 18 hours. Vacuum distillation of the product provided a yield of about 75 per cent of theoretical. Boiling point of the product 74–76° C. (2.5 mm.). Refractive index at 20° C.—1.4894. Formula follows:

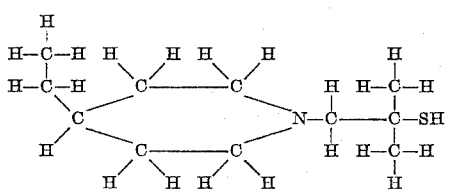

EXAMPLE VI

2-(N-piperidino) cyclohexylthiol

A mixture of 8.5 grams of piperidine and 4.9 grams of cyclohexene sulfide was heated at the reflux temperature for 17 hours. The crude product was taken up with ether, washed with water, and dried over anhydrous sodium sulfate. The extract was distilled under reduced pressure to provide 2-(N-piperidino) cyclohexylthiol, boiling point 97–99° (1 mm.); index of refraction at 20° C. 1.5190. Formula follows:

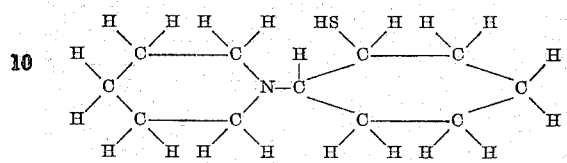

EXAMPLE VII

N,N-bis (2-methyl-2-thiolpropyl) piperazine

A mixture of 3.5 grams of piperazine and 7 grams of isobutylene sulfide was heated at reflux temperature for eighteen hours. On cooling, the reaction mixture crystallized to a solid mass. The crystalline mass was washed twice with 25 ml. portions of hot water and with cold alcohol. Recrystallization from alcohol gave lustrous needles and leaflets, M. P. 127–131° C. Formula follows:

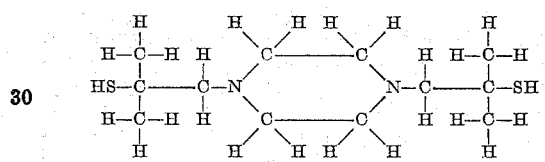

Analyses of various products prepared in accordance with the present invention, as exemplified by the foregoing examples, show that the olefin sulfides of the class described react with amines to produce secondary or tertiary amino thiols. The secondary and tertiary amino thiols were obtained as the principal reaction products almost to the exclusion of primary amino thiols. It is evident that the present invention provides a novel process for the production of secondary and tertiary amino thiols.

It will be understood that it is not the intent to limit the invention by the limitations imposed by the theories set forth hereinabove but that the invention is directed to the reaction between olefin sulfides and amines and to the products formed thereby regardless of the mechanism of the reaction.

We claim:

1. A process for the production of an aminothiol having the group —SH attached to a carbon atom of the class consisting of secondary and tertiary carbon atoms, comprising admixing an olefin sulfide selected from the group consisting of isobutylene sulfide, 2,3-butylene sulfide, cyclopentene sulfide, and cyclohexene sulfide with an amine selected from the group consisting of piperidine, n-heptylamine, beta-pipecoline, di-n-heptylamine, 4-ethyl piperidine and piperazine, and maintaining the resulting admixture at a temperature at least as high as 20° C. and less than 100° C. for a period of from 1 to 100 hours, and recovering said aminothiol from the resulting reaction mixture as a product of the process.

2. A process for the manufacture of an aminothiol, comprising reacting an amine selected from a group consisting of piperidine, n-heptylamine, beta-pipecoline, di-n-heptylamine, 4-ethyl piperidine and piperazine with an olefin sulfide selected from the group consisting of isobutylene sulfide, 2,3-butylene sulfide, cyclopentene sulfide, and cyclohexene sulfide at a temperature of at least 85° C. and less than 100° C. for a period of from 6 to 24 hours, and recovering as a product of the process an aminothiol having the group —SH attached to a carbon atom of the class of secondary and tertiary carbon atoms.

3. A process for the manufacture of an aminothiol, comprising admixing an amine selected from the group consisting of piperidine, n-heptylamine, beta-pipecoline, di-n-heptylamine, 4-ethyl piperidine and piperazine with an olefin sulfide selected from the group consisting of isobutylene sulfide, 2,3-butylene sulfide, cyclopentene sulfide, and cyclohexene sulfide and maintaining the resulting admixture under total reflux conditions at atmospheric pressure for a period of from 6 to 24 hours, and recovering from the resulting reaction mixture an aminothiol having the group —SH attached to a carbon atom of the class consisting of secondary and tertiary carbon atoms.

4. The process of claim 1 wherein said admixture is diluted with an inert diluent.

5. The process of claim 1 wherein the proportion of amine in said admixture exceeds the stoichiometric amount necessary for reaction with said olefin sulfide to form said aminothiol.

6. A process for the production of 2-(N-piperidino) cyclohexylthiol from cyclohexene sulfide and piperidine which comprises admixing piperidine and cyclohexene sulfide and heating the resulting admixture at a temperature within the range of 85 to 100° C. for a duration of from 6 to 24 hours whereby 2-(N-piperidino) cyclohexylthiol is formed as a product of the process, and recovering said product from the reaction mixture.

7. A process for the preparation of N-heptylamino-tert-butylthiol which comprises admixing n-heptylamine with isobutylene sulfide and heating the resulting admixture at a temperature in the range of 85 to 100° C. for a duration of from 6 to 24 hours whereby N-heptylamino-tert-butylthiol is formed as a product of the process, and recovering said product from the reaction mixture.

8. A process for the production of N,N-bis-(2-methyl-2-thiolpropyl) piperazine which comprises admixing piperazine and isobutylene sulfide and heating the admixture at a temperature in the range of from 85 to 100° C. for a duration of from 6 to 24 hours, and recovering from the reaction mixture N,N-bis-(2-methyl-2-thiolpropyl) piperazine as a product of the process.

9. A new composition of matter selected from the group consisting of N-piperidino-tert-butylthiol, N-heptylamino-tert-butylthiol, N-beta-pipecolino-tert-butylthiol, di-n-heptylamino-tert-butylthiol, N-(4-ethylpiperidino)-tert-butylthiol, 2-(N-piperidino) cyclohexylthiol, and N,N-bis(2-methyl-2-thiolpropyl)-piperazine.

10. An aminothiol having the structure

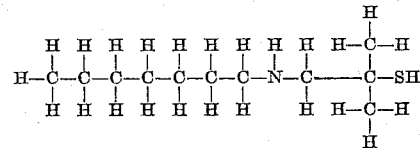

11. An aminothiol having the structure

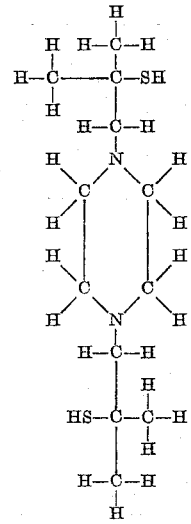

12. An aminothiol having the structure

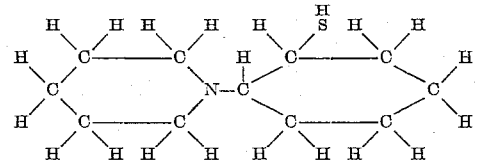

HAROLD R. SNYDER.
JOHN M. STEWART.

REFERENCES CITED

The following references are of record in the file of this patent:

UNITED STATES PATENTS

| Number | Name | Date |
|---|---|---|
| 2,105,845 | Reppe | Jan. 18, 1938 |
| 2,185,660 | Coltof | Jan. 2, 1940 |
| 2,212,141 | Arden | Aug. 20, 1940 |
| 2,225,573 | Tendelov | Dec. 18, 1940 |
| 2,356,388 | Dean | Apr. 22, 1944 |